United States Patent
Prüssmeier

(10) Patent No.: US 11,552,587 B2
(45) Date of Patent: Jan. 10, 2023

(54) METHOD FOR MOVING A ROTOR IN A PLANAR DRIVE SYSTEM

(71) Applicant: Beckhoff Automation GmbH, Verl (DE)

(72) Inventor: Uwe Prüssmeier, Lemgo (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 35 days.

(21) Appl. No.: 17/175,283

(22) Filed: Feb. 12, 2021

(65) Prior Publication Data

US 2021/0184612 A1 Jun. 17, 2021

Related U.S. Application Data

(63) Continuation of application No. PCT/EP2020/067998, filed on Jun. 26, 2020.

(30) Foreign Application Priority Data

Jun. 27, 2019 (DE) .......................... 102019117430.9

(51) Int. Cl.
*H02P 6/00* (2016.01)
*H02P 25/064* (2016.01)
(Continued)

(52) U.S. Cl.
CPC .......... *H02P 25/064* (2016.02); *H02K 11/215* (2016.01); *H02K 41/031* (2013.01);
(Continued)

(58) Field of Classification Search
CPC .......... H02P 6/006; H02P 25/064; H02P 6/16; H02K 11/215; H02K 41/031; H02K 2201/18
See application file for complete search history.

(56) References Cited

U.S. PATENT DOCUMENTS 4,126,797 A 11/1978 Kling
4,458,227 A 7/1984 Petersen
(Continued)

FOREIGN PATENT DOCUMENTS

DE 4305274 A1 9/1994
DE 102008008602 A1 12/2008
(Continued)

OTHER PUBLICATIONS

International Search Report and Written Opinion dated Oct. 19, 2020 in connection with International Patent Application No. PCT/EP2020/067998, 17 pages including English translation.
(Continued)

*Primary Examiner* — Cortez M Cook
(74) *Attorney, Agent, or Firm* — Dorsey & Whitney LLP

(57) ABSTRACT

A method for moving a rotor in a planar drive system having a first and second stator modules and a rotor. The stator modules are arranged at a distance, forming a gap. First and second magnetic fields are generated by the first and stator modules. The first and second magnetic fields hold the rotor in a vertical position, at a distance from a surface of the first and/or second stator module. The first and/or second magnetic fields have a first magnetic field strength to maintain the rotor in the vertical position, and may be used to change a horizontal position of the rotor. The first stator module has a first close range adjacent the gap, where the first magnetic field has a second field strength when the rotor is moved across the gap, greater than the first magnetic field strength.

16 Claims, 10 Drawing Sheets

(51) Int. Cl.
  *H02K 11/215* (2016.01)
  *H02K 41/03* (2006.01)
  *H02P 6/16* (2016.01)
(52) U.S. Cl.
  CPC ............... *H02P 6/006* (2013.01); *H02P 6/16* (2013.01); *H02K 2201/18* (2013.01)

(56) References Cited

U.S. PATENT DOCUMENTS

| | | | |
|---|---|---|---|
| 6,226,073 | B1 | 5/2001 | Emoto |
| 6,353,273 | B1 * | 3/2002 | Heshmat ............. F16C 32/0444 384/103 |
| 9,202,719 | B2 | 12/2015 | Lu et al. |
| 10,116,195 | B2 | 10/2018 | Lu |
| 11,038,410 | B2 | 6/2021 | Brinkmann et al. |
| 2003/0192686 | A1 | 10/2003 | Hisai et al. |
| 2006/0220478 | A1 | 10/2006 | Emoto |
| 2012/0098391 | A1 | 4/2012 | Yamasaki et al. |
| 2012/0156898 | A1 | 6/2012 | Kallee |
| 2012/0307476 | A1 | 12/2012 | Masuzawa et al. |
| 2013/0164687 | A1 | 6/2013 | Binnard et al. |
| 2013/0278087 | A1 | 10/2013 | Kimiabeigi |
| 2014/0062236 | A1 | 3/2014 | Taniguchi et al. |
| 2014/0285122 | A1 | 9/2014 | Lu et al. |
| 2015/0369216 | A1 | 12/2015 | Kisovec |
| 2016/0099623 | A1 | 4/2016 | Böhm et al. |
| 2016/0241173 | A1 * | 8/2016 | Prüssmeier ............. H02P 6/006 |
| 2016/0254722 | A1 | 9/2016 | Yamamoto et al. |
| 2017/0163140 | A1 | 6/2017 | Lu |
| 2017/0179805 | A1 | 6/2017 | Lu |
| 2017/0179806 | A1 | 6/2017 | Lu |
| 2018/0205304 | A1 | 7/2018 | Lu |
| 2018/0212505 | A1 | 7/2018 | Ding |
| 2020/0303997 | A1 | 9/2020 | Brinkmann et al. |
| 2020/0304007 | A1 | 9/2020 | Brinkmann et al. |
| 2020/0304008 | A1 | 9/2020 | Brinkmann et al. |
| 2020/0304009 | A1 | 9/2020 | Brinkmann et al. |
| 2020/0304010 | A1 | 9/2020 | Brinkmann et al. |
| 2020/0321846 | A1 | 10/2020 | Brinkmann et al. |
| 2021/0091621 | A1 | 3/2021 | Brinkmann et al. |
| 2021/0091622 | A1 | 3/2021 | Brinkmann et al. |
| 2022/0131426 | A1 | 4/2022 | Prüssmeier |

FOREIGN PATENT DOCUMENTS

| | | |
|---|---|---|
| DE | 102012025323 A1 | 6/2014 |
| DE | 102017003120 A1 | 10/2018 |
| DE | 102017131304 A1 | 6/2019 |
| DE | 102017131320 A1 | 6/2019 |
| DE | 102018117981 A1 | 1/2020 |
| DE | 102019117430 A1 | 12/2020 |
| DE | 102019117431 A1 | 12/2020 |
| EP | 2165406 B1 | 4/2013 |
| JP | H0618519 A | 1/1994 |
| WO | 2013059934 A1 | 5/2013 |
| WO | 2015184553 A1 | 12/2015 |
| WO | 2017004716 A1 | 1/2017 |
| WO | 2018176137 A1 | 10/2018 |
| WO | 2019129547 A1 | 7/2019 |
| WO | 2019129561 A1 | 7/2019 |
| WO | 2019129562 A1 | 7/2019 |
| WO | 2019129564 A1 | 7/2019 |
| WO | 2019129566 A1 | 7/2019 |
| WO | 2019129576 A1 | 7/2019 |
| WO | 2020020605 A1 | 1/2020 |
| WO | 2020020607 A1 | 1/2020 |
| WO | 2020260564 A1 | 12/2020 |
| WO | 2020260566 A1 | 12/2020 |

OTHER PUBLICATIONS

Office Action dated May 28, 2020 in connection with German patent application No. 102019117430.9, 14 pages including English translation.

* cited by examiner

METHOD FOR MOVING A ROTOR IN A PLANAR DRIVE SYSTEM

CROSS-REFERENCE TO RELATED APPLICATIONS

This is a continuation of International Patent Application PCT/EP2020/067998, filed on Jun. 26, 2020, entitled METHOD FOR MOVING A ROTOR IN A PLANAR DRIVE SYSTEM, and claims the priority of German patent application DE 10 2019 117 430.9 filed on Jun. 27, 2019, entitled VERFAHREN ZUM BEWEGEN EINES LÄUFERS IN EINEM PLANARANTRIEBSSYSTEM, each of which is incorporated by reference herein, in the entirety and for all purposes.

FIELD

The present invention relates to a method for moving a rotor in a planar drive system. Furthermore, the present invention relates to a computer program and a control unit for carrying out the method as well as to a planar drive system comprising such a control unit.

BACKGROUND

Planar drive systems may be used, among other things, in automation technology, in particular in manufacturing technology, handling technology and process engineering. Planar drive systems may be used to move or position a moving element of a plant or machine in at least two linearly independent directions. Planar drive systems may comprise a permanently energized electromagnetic planar motor with a planar stator and a rotor movable on the stator in at least two directions.

In German patent application DE 10 2017 131 304.4 of 27 Dec. 2017, published as DE 10 2017 131 304 A1, a planar drive system is disclosed in which a rotor may be moved via a plurality of stator modules arranged next to one another. Magnetic drive fields are generated by means of conductor strips in the stator modules and interact with permanent magnets in the rotor in such a way that the rotor may be held suspended above the stator modules or driven by a traveling magnetic field. The traveling field may be generated across the edges of the stator modules and then pass over to an adjacent stator module.

With regard to the general design of stator modules and rotors, stator segments and conductor strips as well as with regard to energizing of the conductor strips in order to hold a rotor above a stator surface by means of magnetic fields generated by energizing of the conductor strips or to drive it by means of a travelling field, reference is made to the description of the German patent application DE 10 2017 131 304.4, in particular to the description of FIGS. 1, 2, 10, 11 and 12. With respect to these aspects, the disclosure content of German patent application DE 10 2017 131 304.4 is expressly incorporated by into the present patent application by back-referencing.

SUMMARY

The invention provides an improved drive method for a planar drive system in which a rotor may be moved across a gap arranged between two stator modules. The invention further provides a computer program and a control unit for carrying out the method, and a planar drive system comprising such a control unit.

If a gap is present between two stator modules, it is possible in spite of the gap to move a rotor from a first stator module to a second stator module across the gap.

According to a first aspect, the present patent application relates to a method of moving a rotor in a planar drive system across a gap between two stator modules. Thus, the planar drive system has at least one first stator module, at least one second stator module, and at least one rotor, wherein the first stator module and the second stator module are arranged at a distance from each other and a gap is formed between the first stator module and the second stator module. A first magnetic field may be generated by the first stator module. A second magnetic field may be generated by the second stator module. The first magnetic field and the second magnetic field, respectively, may maintain the rotor in a vertical position at a distance from a surface of the first stator module and the second stator module, with the rotor then floating above the first stator module and the second stator module, respectively. Here, the first magnetic field and the second magnetic field, respectively, have a first magnetic field strength by mean of which the rotor may be held in the vertical position. The first magnetic field strength thus produces a first force on the rotor, in particular on permanent magnets arranged in the rotor, which corresponds to the weight force of the rotor and any loading of the rotor. The first magnetic field and the second magnetic field may further be used to change a horizontal position of the rotor, for example by configuring the first magnetic field and/or the second magnetic field as a traveling magnetic field. The first stator module includes a first proximal region adjacent to the gap. If the rotor is moved across the gap, the first magnetic field in the first close range has a second magnetic field strength that is greater than the first magnetic field strength.

Vertical position generally means the position of the rotor perpendicular to the surface of the stator module. Consequently, when a stator module is mounted in parallel to a vertical wall in space, the change of the vertical position of the rotor describes a movement of the rotor horizontally in space. Similarly, the horizontal position generally describes the position of the rotor in parallel to the surface of the stator module. Consequently, when a stator module is mounted on a vertical wall, the change of the horizontal position of the rotor describes a movement vertically in space. Holding the rotor horizontally is understood in the following as holding the rotor in parallel to the surface of a stator module. When a stator module is mounted on a wall, parallel holding of the rotor means holding the rotor vertically in space. Furthermore, parallel alignment of the rotor with regard to the surface of a stator module also means a tilting of the rotor of up to 5° between the surface of the stator module and the rotor. Such tilting may be used, for example, to compensate for acceleration of a liquid in a vessel on the rotor to prevent the liquid from sloshing out of the vessel due to acceleration.

If the rotor is moved across the gap, a part of the rotor is located above the gap. Since there are no conductor strips in the area of the gap to generate a magnetic field, the rotor above the gap is not supported by a corresponding magnetic field. If the first magnetic field is generated with the second magnetic field strength in the first close range of the first stator module, i.e. if it is amplified compared to the first magnetic field strength, this may compensate for the force missing above the gap and the rotor may be held further in the vertical position. Thus, close to the gap, the rotor is supported by a stronger magnetic force to compensate for the missing force in the area of the gap.

According to a second aspect, the invention comprises a computer program comprising program code which, when executed on a computer, causes the computer to perform the described method.

According to a third aspect, the invention comprises a control unit comprising a computing unit and communication means. The communication means may be used to read signals from position detectors of stator modules and to output control signals for the stator modules. The control unit is set up to output a control signal for controlling magnetic fields of the stator modules to the stator modules on the basis of the signals from the position detectors and a travel path specified for a rotor across a gap arranged between two stator modules in such a way that the magnetic fields generated by the stator modules may be varied at least temporarily during a crossing of the gap. Furthermore, the control unit may be set up to execute one of the described methods. In this case, the varied magnetic field may have the second magnetic field strength and be amplified relative to the first magnetic field strength, or have the third magnetic field strength and be attenuated relative to the first magnetic field strength, or have a magnetic field strength that exerts a force on the rotor that acts in the opposite direction to the force of the first magnetic field strength.

According to a fourth aspect, the invention comprises a planar drive system having at least two stator modules arranged at a distance, at least one rotor and at least one such control unit. A maximum gap width may depend on dimensions of the stator modules and may e.g. be a maximum of 20 percent of a spatial extent of the stator modules. Alternatively, the maximum gap width may correspond to a magnetizing period length. In a further alternative embodiment, it may be provided that energizable conductors within the stator modules form stator segments with a predetermined segment width and the maximum gap width corresponds to the predetermined segment width. It is possible to arrange six conductor strips of a three-phase system in a stator segment.

EXAMPLES

In an embodiment of the method, the first magnetic field has a third magnetic field strength in a first far range from the gap when the rotor is moved across the gap. The first far range is arranged at a distance from the gap. The third magnetic field strength is smaller than the first magnetic field strength.

This allows the force missing above the gap to be further compensated and the rotor to be held in the vertical position. Thus, close to the gap, the rotor is supported by a stronger magnetic force and additionally, away from the gap, less strongly supported by a magnetic force. Thus, it is possible to keep the rotor in a position parallel to the surface of the stator modules even though the rotor is partially positioned above the gap.

In an embodiment of the method, the first magnetic field in the first far range exerts a force onto the rotor that acts in the opposite direction to the force in the close range. This may e.g. be done by correspondingly energizing conductor strips in the far range, wherein, in contrast to the previous embodiment, a current direction is reversed or a polarity of the conductor strip is changed. In this way, the tilt acting upon the rotor when its center of gravity, or its shared center of gravity with a transported product, is located above the gap may be compensated for and the rotor may be held in a position parallel to the surface of the stator modules.

In a further embodiment of the method, the rotor is arranged completely above the first stator module in an initial position and is arranged partially above the first stator module and partially above the gap in a first intermediate position. In this case, while the rotor is in the initial position, the first magnetic field is nearly homogeneous over an extension of the rotor and exhibits the first magnetic field strength. The first magnetic field may also be slightly inhomogeneous in the initial position, since, for example, an asymmetrical loading of the rotor with a product must also be compensated for. Herein, homogeneous means the constant amount of magnetic field strength centered under the permanent magnets of the rotor. While the rotor is in the first intermediate position, the first magnetic field in the first close range exhibits the second magnetic field strength and thus a clear inhomogeneity.

In the initial position, the rotor is thus held in the vertical position by a force generated by the first magnetic field, the force being constant over the extension of the rotor. The wording that the force is constant over the extension of the rotor and the wording that the first magnetic field is nearly homogeneous over an extension of the rotor may thus be used synonymously and have an identical meaning. It is only when the rotor is moved to the first intermediate position that the first magnetic field is amplified in the first close range, in that it now has the second magnetic field strength in the first close range.

In an embodiment of the method, the rotor is disposed in a second intermediate position partially above the first stator module, partially above the gap, and partially above the second stator module. The first magnetic field and the second magnetic field may keep the rotor horizontal and parallel to the surface of the stator modules, respectively, while the rotor is in the second intermediate position. On the one hand, the rotor may be held horizontal by the second magnetic field of the second stator module also having the second magnetic field strength in a second close range adjacent to the gap. Alternatively, the rotor may be held horizontal by the second magnetic field of the second stator module in a second close range adjacent to the gap and the first magnetic field of the first stator module in the first close range having the first magnetic field strength when the rotor is in the second intermediate position.

It may thus be sufficient to embody the first magnetic field and the second magnetic field homogeneously to the first magnetic field strength when the rotor is in the second intermediate position. Alternatively, the first magnetic field and the second magnetic field may be embodied with the second magnetic field strength in the first close range and in the second close-up range, respectively, when the rotor is in the second intermediate position. This makes it possible to at least partially compensate for a reduced load-bearing force for the rotor due to the gap. The first magnetic field strength of the first magnetic field and the first magnetic field strength of the second magnetic field may have different amounts when the rotor is in the second intermediate position. Similarly, the second magnetic field strength of the first magnetic field and the second magnetic field strength of the second magnetic field may have different amounts when the rotor is in the second intermediate position.

In another embodiment of the method, the rotor is arranged in a third intermediate position partially above the second stator module and partially above the gap, wherein the second stator module has a second close range adjacent to the gap, and wherein the second magnetic field in the second close range has the second magnetic field strength when the rotor is in the third intermediate position.

In the third intermediate position, the rotor is therefore no longer above the first stator module and is held in the vertical position only by the second magnetic field of the second stator module. Since the second magnetic field in the second close range is embodied with the second magnetic field strength, the rotor may be held further in the vertical position by this amplification of the magnetic field. The forces acting upon the rotor may be analogous to the forces in the first intermediate position.

In addition, it is possible to embody the second magnetic field in a second far range with the third magnetic field strength, in analogy to the embodiments described for the first stator module, when the rotor is to be moved across the gap. The second far range is arranged at a distance from the gap. In this case, a force may also be generated in the second far range which acts in the opposite direction to the force in the second close range.

In a further embodiment of the method, the rotor is completely arranged above the second stator module in an end position. While the rotor is in the end position, the second magnetic field may be nearly homogeneous over an extension of the rotor. The rotor is now completely above the second stator module and is kept parallel and at a distance from the surface of the second stator module by the nearly homogeneous second magnetic field in the vertical position.

In a further embodiment of the method, the first magnetic field and the second magnetic field may dynamically change between the first, second, third and/or further magnetic field strengths during the transition of the rotor between the initial position, the first intermediate position, the second intermediate position, the third intermediate position and/or the final position in the first and/or second far range and/or in the first and/or second close range. This has the advantage that e.g. during the transition of the rotor between the initial position and the first intermediate position, the rotor may be kept parallel to the surface of the first stator module.

In an embodiment of the method, the position of the rotor is determined by position detectors installed in the first stator module and/or in the second stator module. The first stator module is controlled to set the first magnetic field and the second stator module is controlled to set the second magnetic field on the basis of the position determination of the rotor. The position detectors may be embodied as magnetic field sensors. The position may then be determined on the basis of a measurement of a rotor magnetic field generated by permanent magnets of the rotor. Such a position determination is disclosed in the German patent application DE 10 2017 131 320.6 of 27 Dec. 2017, published as DE 10 2017 131 320 A1, the contents of which with respect to the position determination are hereby expressly incorporated by reference.

In another embodiment of the method, the first stator module includes first energizable conductors and the second stator module includes second energizable conductors. Energizing the first energizable conductors leads to the formation of the first magnetic field. Energizing the second energizable conductors results in the formation of the second magnetic field. The first magnetic field and the second magnetic field may be implemented with the described magnetic field strengths by setting a current strength during energizing of the first energizable conductors and the second energizable conductors, respectively, which may lead to the first magnetic field strength, the second magnetic field strength and optionally to the third magnetic field strength. The energizable conductors may be embodied as conductor paths.

BRIEF DESCRIPTION OF THE DRAWINGS

The invention will be discussed in more detail below by means of embodiments and examples and with reference to the accompanying figures. Here, in a schematic illustration in each case.

DETAILED DESCRIPTION

Figure 1:
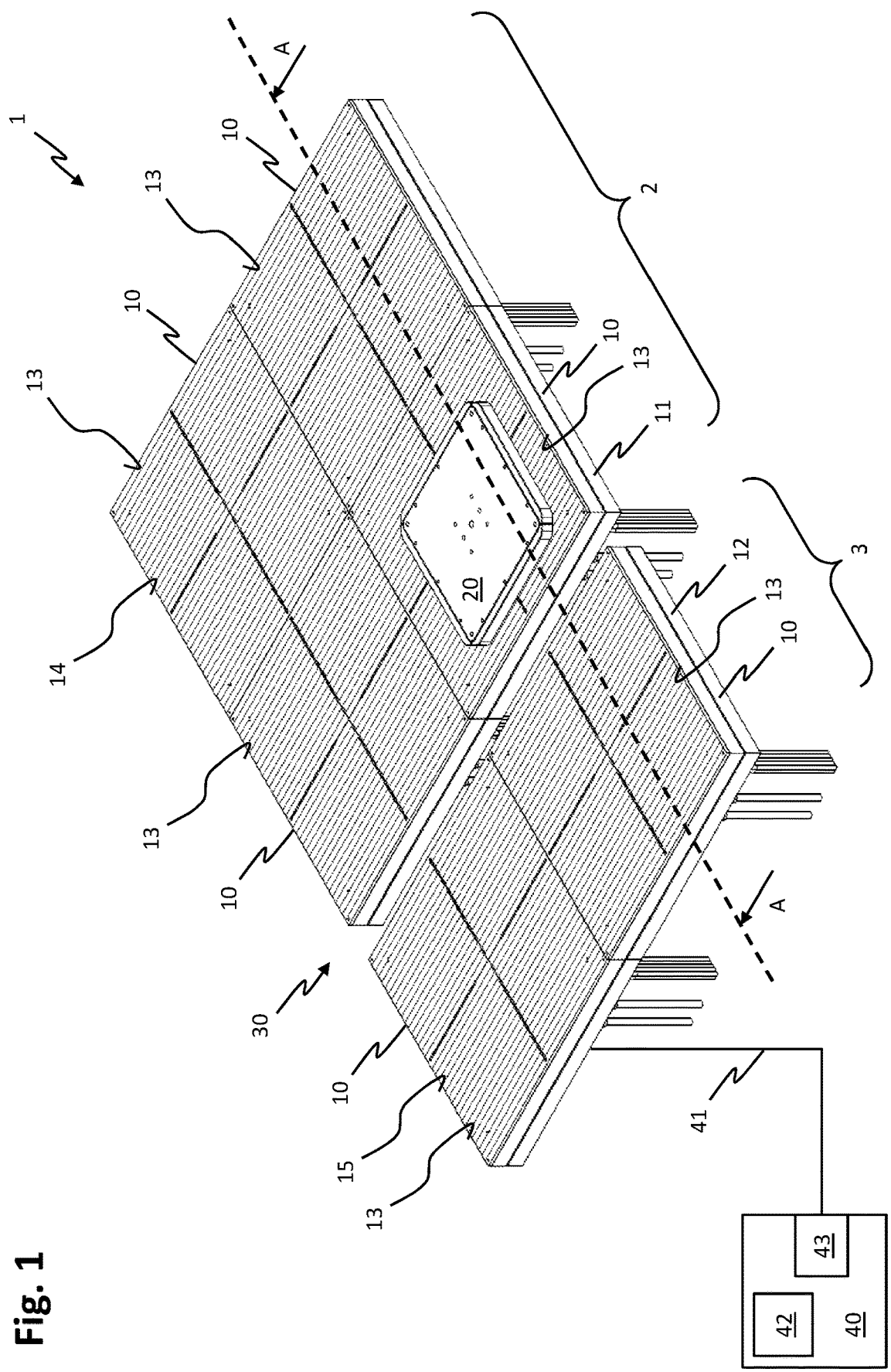
FIG. 1 shows an isometric view of a planar drive system.

FIG. 1 shows an isometric view of a planar drive system 1 comprising a plurality of stator modules 10 and a rotor 20. The stator modules 10 may each be configured as described in the German patent application DE 10 2017 131 304.4 dated 27 Dec. 2017. In particular, the stator modules 10 may comprise the conductor strips for generating magnetic fields and/or travelling magnetic fields described in this patent application. In this regard, the magnetic fields may be used to maintain the rotor 20 in a vertical position at a distance from the stator modules 10 and to move the rotor 20 by the traveling field. Further, it may be provided that the planar drive system 1 includes more than one rotor 20, but only one rotor 20 is shown in FIG. 1. The planar drive system 1 is divided up into a first area 2 and a second area 3. In the first area 2, the planar drive system 1 has four stator modules 10. In the second area 3, the planar drive system 1 has two stator modules 10. A gap 30 is arranged between the first area 2 and the second area 3.

The stator modules 10 each have a stator surface 13. The rotor 20 may be moved above the stator surfaces 13. The stator surfaces 13 each form a continuous movement surface in the first area 2 and in the second area 3, a first movement surface 14 in the first area 2, and a second movement surface 15 in the second area 3. No stator surface 13 is arranged in the region of the gap 30, since the stator modules 10 are arranged at a distance to one another in the region of the gap 30 and, as a result, the stator surfaces 13 of the first movement surface 14 associated with the stator modules 10 in the first region 2 and the stator surfaces 13 of the second movement surface 15 associated with the stator modules 10 in the second region 3 are also arranged at a distance from one another by the gap 30. The first movement surface 14 is thus separated from the second movement surface 15 by the gap 30.

The stator modules 10 are connected to a control unit 40 by communication lines 41. The control unit 40 may be adapted to output control commands to the stator modules 10. For this purpose, the control unit 40 may comprise communication means 43, which are e.g. embodied as a communication interface. The control unit 40 may have a computing unit 42. On the basis of the control commands, selected conductor strips of the stator modules 10 may be energized, and on the basis of the control commands, a current intensity and/or output power may also be influenced, and thus a magnetic field intensity may be set. The control commands may thereby be generated by the computing unit 42 if the control unit 40 is used in the method according to the invention. In particular, the computing unit may thereby have access to a computer program stored in a readable memory, wherein the memory may comprise a hard disk, a CD, a DVD, a USB stick or another storage medium.

The rotor 20 is arranged above a first stator module 11. The first stator module 11 is adjacent to the gap 30. A second stator module 12 is arranged on a side opposite to the gap 30. The first stator module 11 is thus associated with the first movement surface 14, and the second stator module 12 is associated with the second movement surface 15. With the method according to the invention, it is possible to move the rotor 20 from the first stator module 11 to the second stator module 12, the rotor 20 crossing the gap 30 due to this movement and thus passing from the first movement surface 14 to the second movement surface 15.

Figure 2:
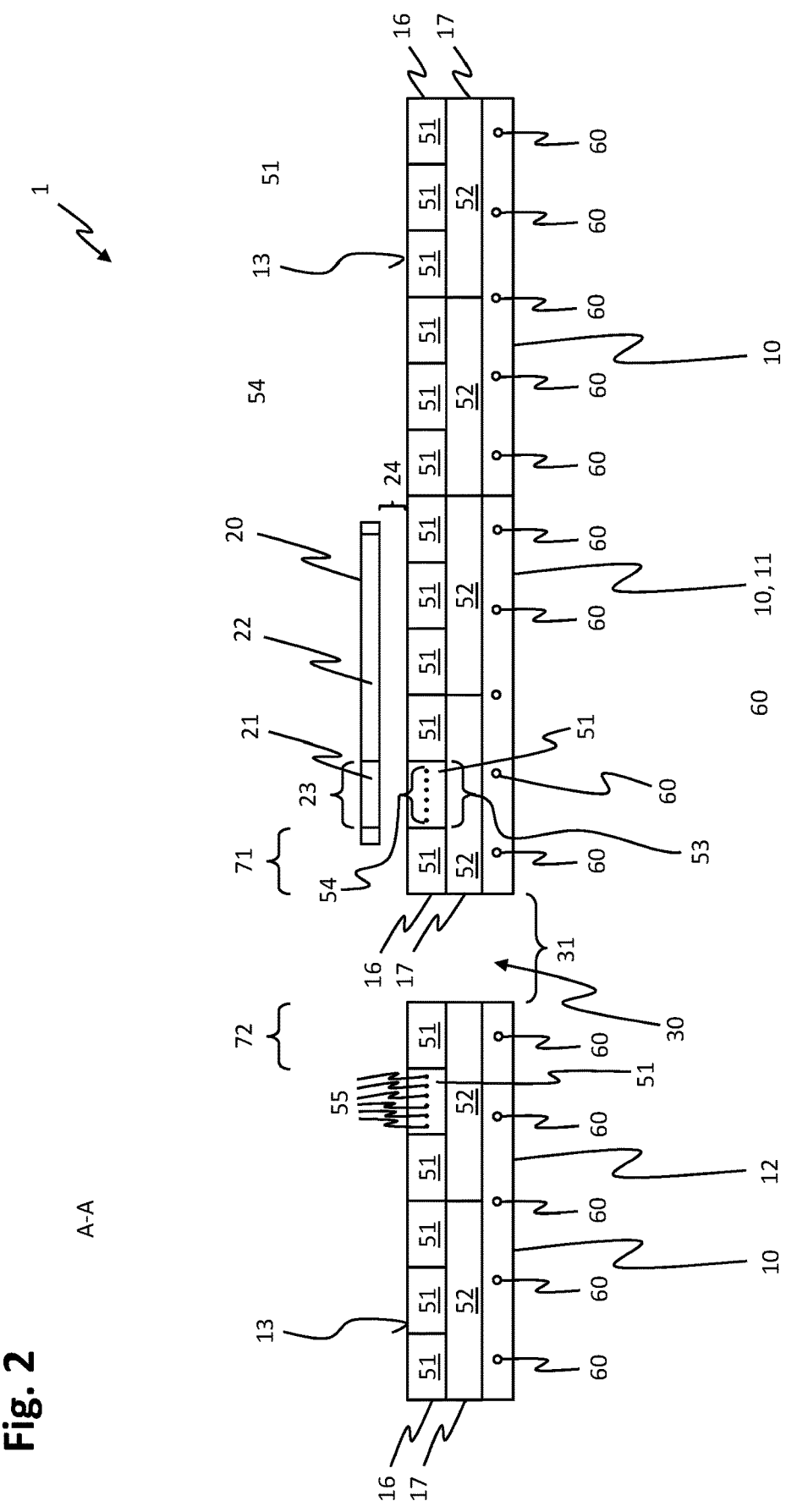
FIG. 2 shows a cross-section of the planar drive system.

FIG. 2 shows a cross-section through the planar drive system 1 of FIG. 1 along a sectional plane A-A shown in FIG. 1. The rotor has a first magnet unit 21 and a second magnet unit 22, which are configured as described in German patent application DE 10 2017 131 304.4 of 27 Dec. 2017. In its spatial extent, a magnetizing period 23 corresponds to a dimension of the first magnet unit 21. The stator modules 10 have a first stator layer 16 and a second stator layer 17, which are arranged at right angles one on top of the other as described in German patent application DE 10 2017 131 304.4 of 27 Dec. 2017.

In the first stator layer 16, first stator segments 51 are thereby arranged, each having a segment width 53, the segment width 53 corresponding to the magnetizing period 23. Within the cross-section of a stator module 10, six first stator segments 51 and two second stator segments 52 perpendicular thereto are in each case shown, the second stator segments 52 forming the second stator layer 17. In total, the stator modules 10 each have twelve first stator segments 51 and twelve second stator segments 52, although not all first stator segments 51 and second stator segments 52 are shown in FIG. 2. Within each of the first stator segments 51 and the second stator segments 52, respectively, a three-phase system with six conductor strips may be arranged as described in German patent application DE 10 2017 131 304.4 dated 27 Dec. 2017, and serve to generate a magnetic field.

In one of the first stator segments 51 of the first stator module 11, six first energizable conductor strips 54 are exemplarily shown and the further first stator segments 51 and the second stator segments 52 of the first stator module 11 may also be embodied accordingly. The magnetic field generated by the first energizable conductor strips 54 may hold the rotor 20 in a vertical position 24 and generate a movement of the rotor 20 parallel to the stator surfaces 13 in the form of a traveling field. Six second energizable conductor strips 55 are exemplarily shown in one of the first stator segments 51 of the second stator module 12, and the further first stator segments 51 and the second stator segments 52 of the second stator module 12 may also be embodied accordingly. The magnetic field generated by the second energizable conductor strips 55 may hold the rotor 20 in a vertical position 24 and generate a movement of the rotor 20 parallel to the stator surfaces 13 in the form of a traveling field.

The stator modules 10 further comprise position detectors 60 by which a permanent magnetic field of the first magnet unit 21 and the second magnet unit 22, respectively, may be detected, thus enabling conclusions to be drawn about a position of the rotor 20.

The gap 30 has a gap width 31 that may correspond to the magnetizing period 23 or the segment width 53, but smaller gap widths 31 are also possible. A minimum gap width may be one millimeter or correspond to a minimum predetermined fraction of the magnetizing period 23 or the segment width 53, respectively, for example ten percent of the magnetizing period 23 or the segment width 53. The first stator module 11 has a first close range 71 adjacent to the gap 30. In its extent, the first close range 71 corresponds to the segment width 53, but may also be wider or narrower than the segment width 53.

When the rotor 20 is moved across the gap 30 in the planar drive system 1, a first magnetic field is generated by the first stator module 11 and a second magnetic field is generated by the second stator module 12. The first magnetic field and the second magnetic field, respectively, keep the rotor 20 at a distance from a surface of the first stator module 11 and the second stator module 12 in a vertical position 24, wherein said surface may correspond to the stator surface 13. The first magnetic field and the second magnetic field, respectively, comprise a first magnetic field strength, wherein a magnetic field having the first magnetic field strength is suitable for holding the rotor 20 in the vertical position 24. Additionally, the first magnetic field and the second magnetic field are used to change a horizontal position of the rotor 20. When the rotor 20 is moved across the gap 30, the first magnetic field in the first close range 71 has a second magnetic field strength that exceeds the first magnetic field strength.

Figure 3:
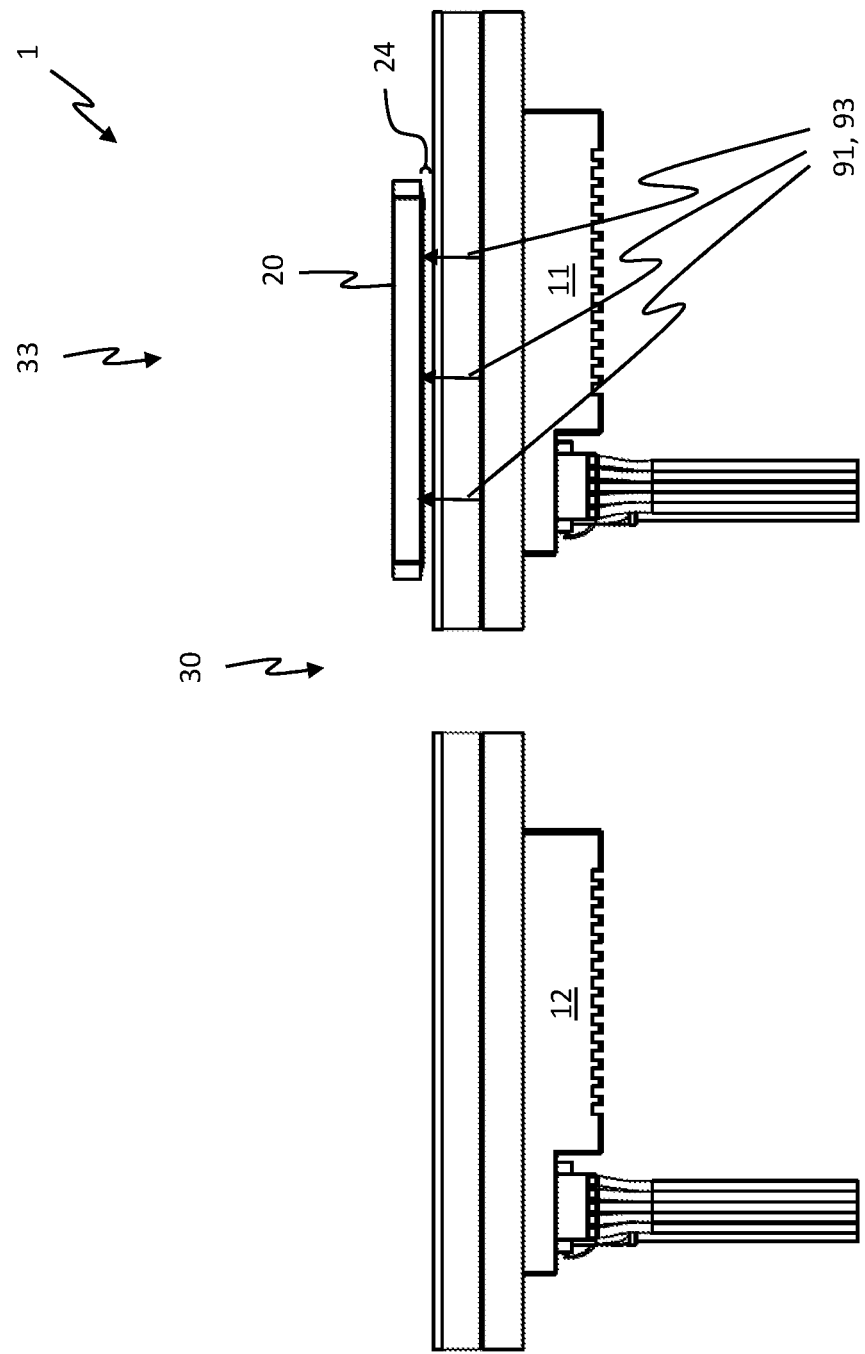
FIG. 3 shows a section of a side view of the planar drive system with a rotor in an initial position.

FIG. 3 shows a section of a side view of the planar drive system with a rotor in a starting position 33 in which the rotor 20 is arranged completely above the first stator module 11 in a starting position 33. In this case, the planar drive system 1, the first stator module 11, the second stator module 12, and the rotor are arranged as shown in FIGS. 1 and 2. A first magnetic field 91, represented by arrows is arranged to hold the rotor 20 in the vertical position 24 above the first stator module 11. The first magnetic field 91 thereby has a first magnetic field strength 93 that is nearly homogeneous over the extension of the rotor 20. This is symbolized by the fact that the arrows symbolizing the first magnetic field 91 have an identical length. The first magnetic field 91 may thereby be generated by the first stator segments 51 and second stator segments 52 described for FIG. 2 and interact with the first magnet unit 21 and the second magnet unit 22 of the rotor 20, respectively. The first magnetic field 91 may be embodied as a traveling field, wherein the rotor 20 is moved toward the gap 30 due to the traveling field.

Figure 4:
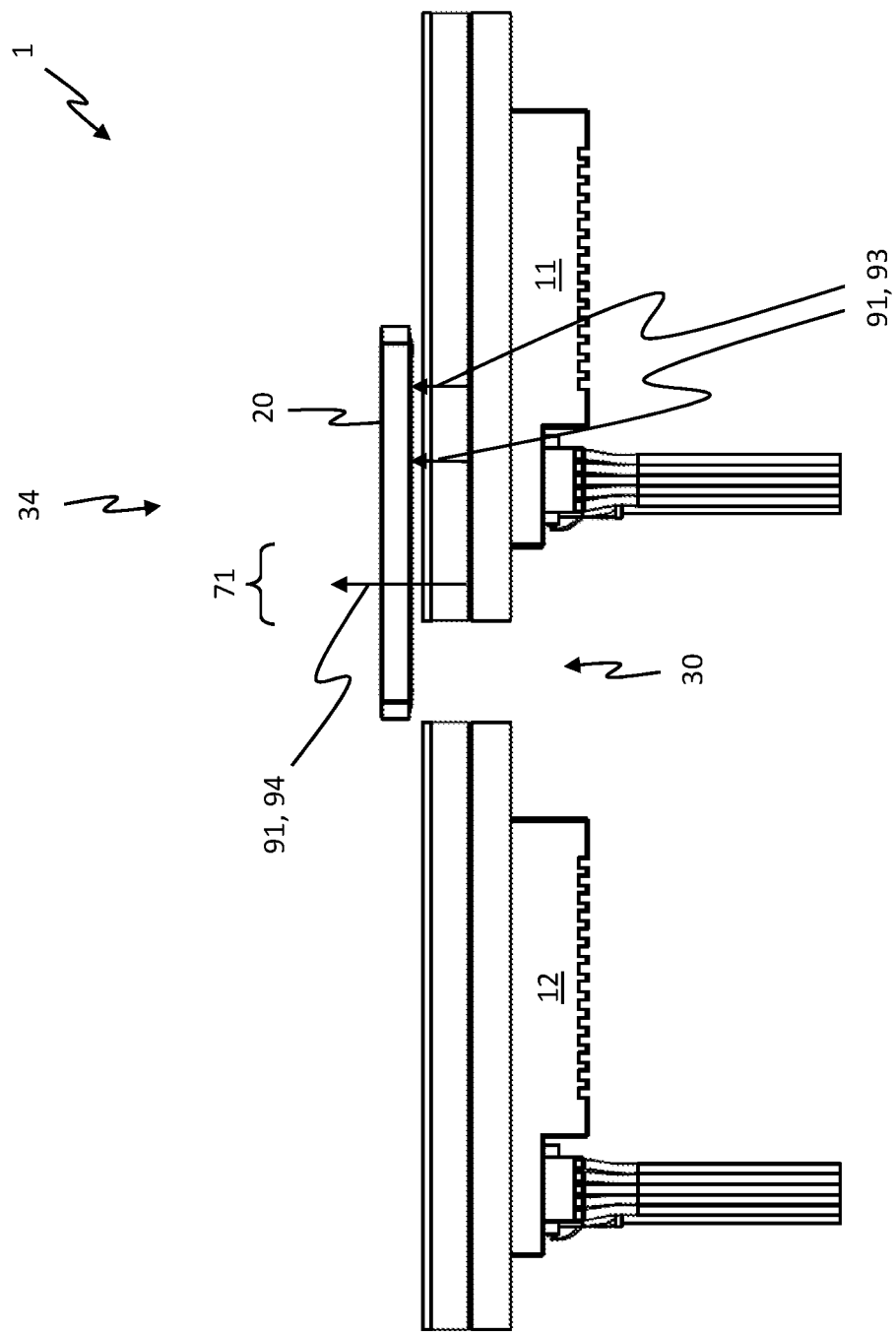
FIG. 4 shows a section of a side view of the planar drive system with a rotor in a first intermediate position.

FIG. 4 shows the planar drive system 1 of FIG. 3 after the rotor 20 has been moved toward the gap 30 and is now in a first intermediate position 34. In the first intermediate position 34, the rotor 20 is partially above the first stator module 11 and partially above the gap 30, but not above the second stator module 12. The first magnetic field 91 now has a second magnetic field strength 94 in the first close range 71, the second magnetic field strength 94 being larger than the first magnetic field strength 93. Outside of the first close range 71, the first magnetic field 91 is formed with the first magnetic field strength 93.

In the first close range 71, the first magnetic field 91 is thus amplified in order to compensate, by a magnetic force generated thereby in the first close range 71 on the rotor 20, which results from an interaction between the first stator segments 51 and the second stator segments 52 on the one hand and the first magnetic units 21 and the second magnetic units 22 on the other hand, for the fact that the rotor 20 is no longer supported above the gap 30 by corresponding magnetic forces. The first magnetic field 91 amplified in the first close range 71 may be embodied in such a way that the rotor 20 is held in a horizontal position. The second magnetic field strength 94 may depend on a weight carried by the rotor 20.

Figure 5:
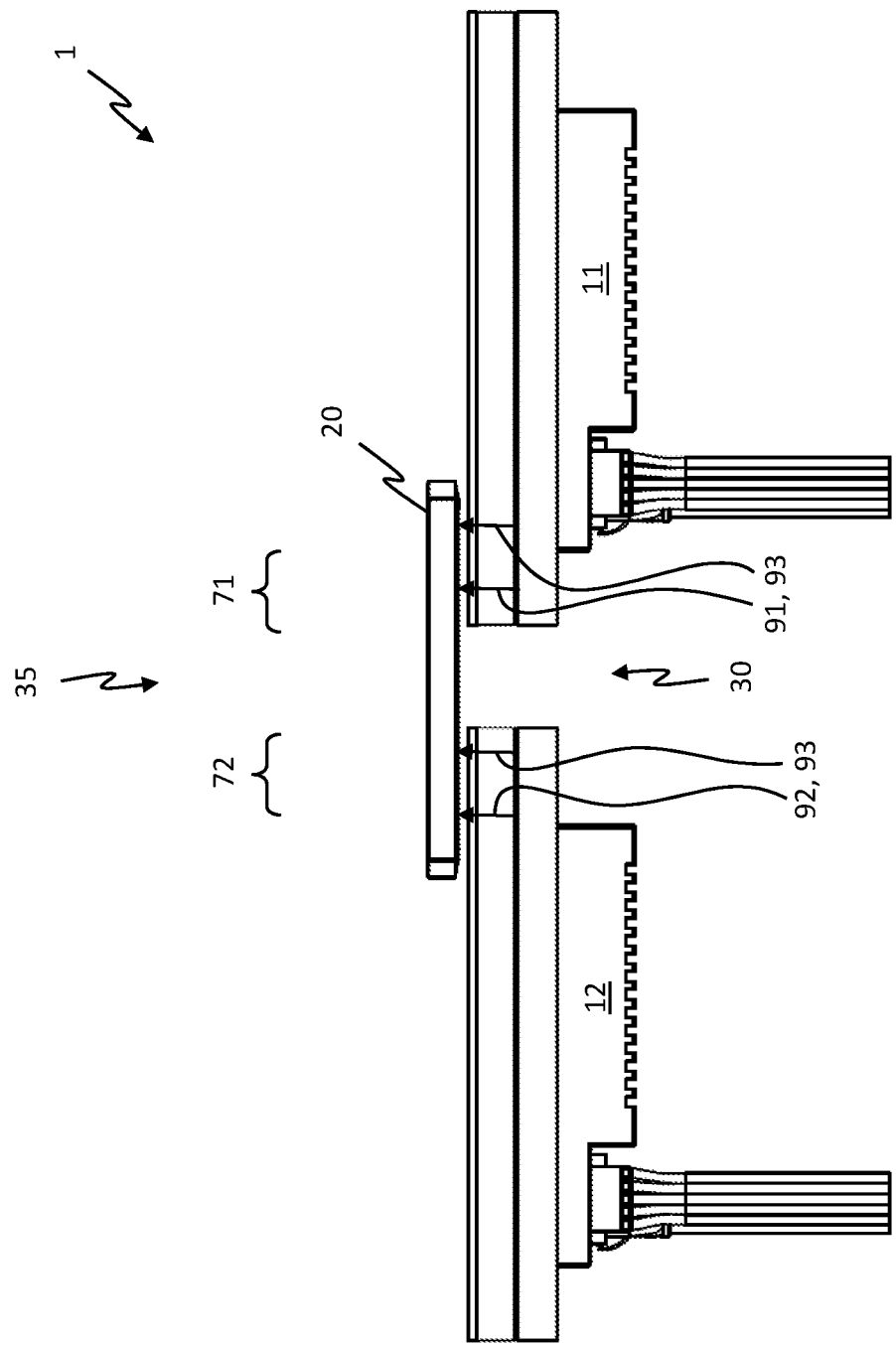
FIG. 5 shows a section of a side view of the planar drive system with a rotor in a second intermediate position.

FIG. 5 shows the planar drive system 1 of FIGS. 3 and 4 after the rotor 20 has been moved to a second intermediate position 35, wherein the rotor 20 is arranged in the second intermediate position 35 above the first stator module 11, the second stator module 12 and the gap 30. The first magnetic field 91 exhibits the first magnetic field strength 93 both in the first close range 71 and outside the first close range 71. A second magnetic field 92 of the second stator module 12 also exhibits the first magnetic field strength 93 both in a second close range 72 and outside of the second close range 72, so that the rotor 20 may be held horizontal in the second intermediate position 35. In case of an uneven loading of the rotor 20 or in case of an asymmetrical positioning of the rotor 20 above the gap 30 in the second intermediate position 35, the first magnetic field strength 93 of the first magnetic field 91 may also differ from the first magnetic field strength 93 of the second magnetic field 92.

Figure 6:
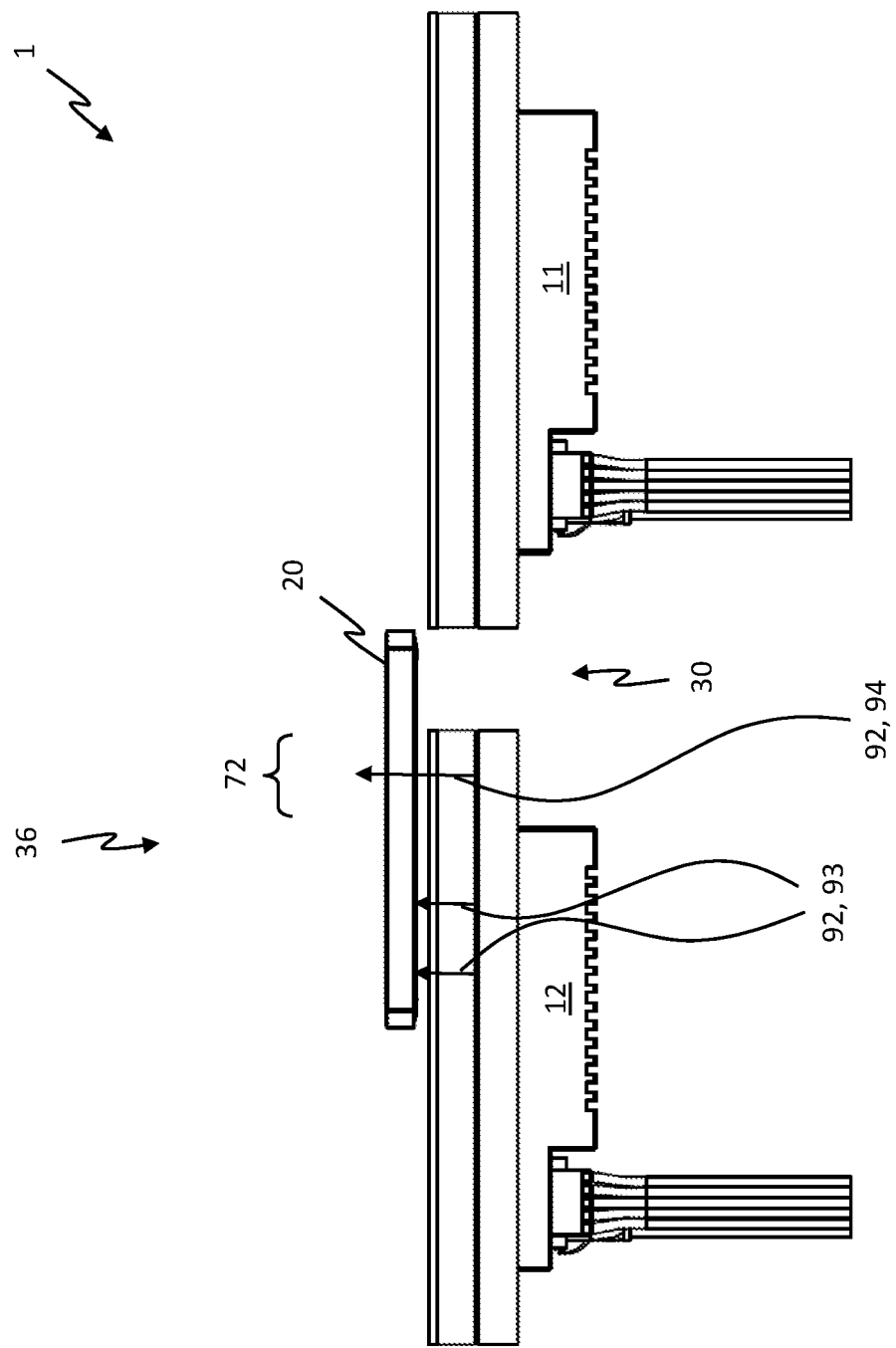
FIG. 6 shows a section of a side view of the planar drive system with a rotor in a third intermediate position.

FIG. 6 shows the planar drive system 1 of FIGS. 3 to 5 after the rotor 20 has been moved to a third intermediate position 36. In the third intermediate position 36, the rotor 20 is partially above the second stator module 12 and partially above the gap 30, but not above the first stator module 11. In the second close-up range 72, the second magnetic field 92 has the second magnetic field strength 94, which in turn is greater than the first magnetic field strength 93. Outside of the second close range 72, the second magnetic field 92 is formed with the first magnetic field strength 93.

In the second close range 72, the second magnetic field 92 is thus amplified in order to compensate, by a magnetic force generated thereby in the second close range 72 on the rotor 20, which results from an interaction between the first stator segments 51 and the second stator segments 52 on the one hand and the first magnet units 21 and the second magnet units 22 on the other hand, for the fact that the rotor 20 is no longer supported above the gap 30 by corresponding magnetic forces. The second magnetic field 92 amplified in the second close range 72 may thereby be embodied in such a way that the rotor 20 may be held in a horizontal position. The second magnetic field strength 94 may depend on a weight carried by the rotor 20.

In the third intermediate position 36 or, respectively, the first intermediate position 34 of FIG. 4, the rotor 20 is thus kept horizontal by amplifying the second magnetic field 92 or, respectively, the first magnetic field 91 in the first close range 71 or in the second close range 72, respectively, the amplification of the magnetic field being identical in the illustrations of FIGS. 4 and 6. If the rotor 20 is unevenly loaded, the amplification may also be adapted accordingly so that the second magnetic field 92 in the second close range 72 has a further second magnetic field strength which differs from the second magnetic field strength 94 and is larger than the first magnetic field strength 93.

Figure 7:
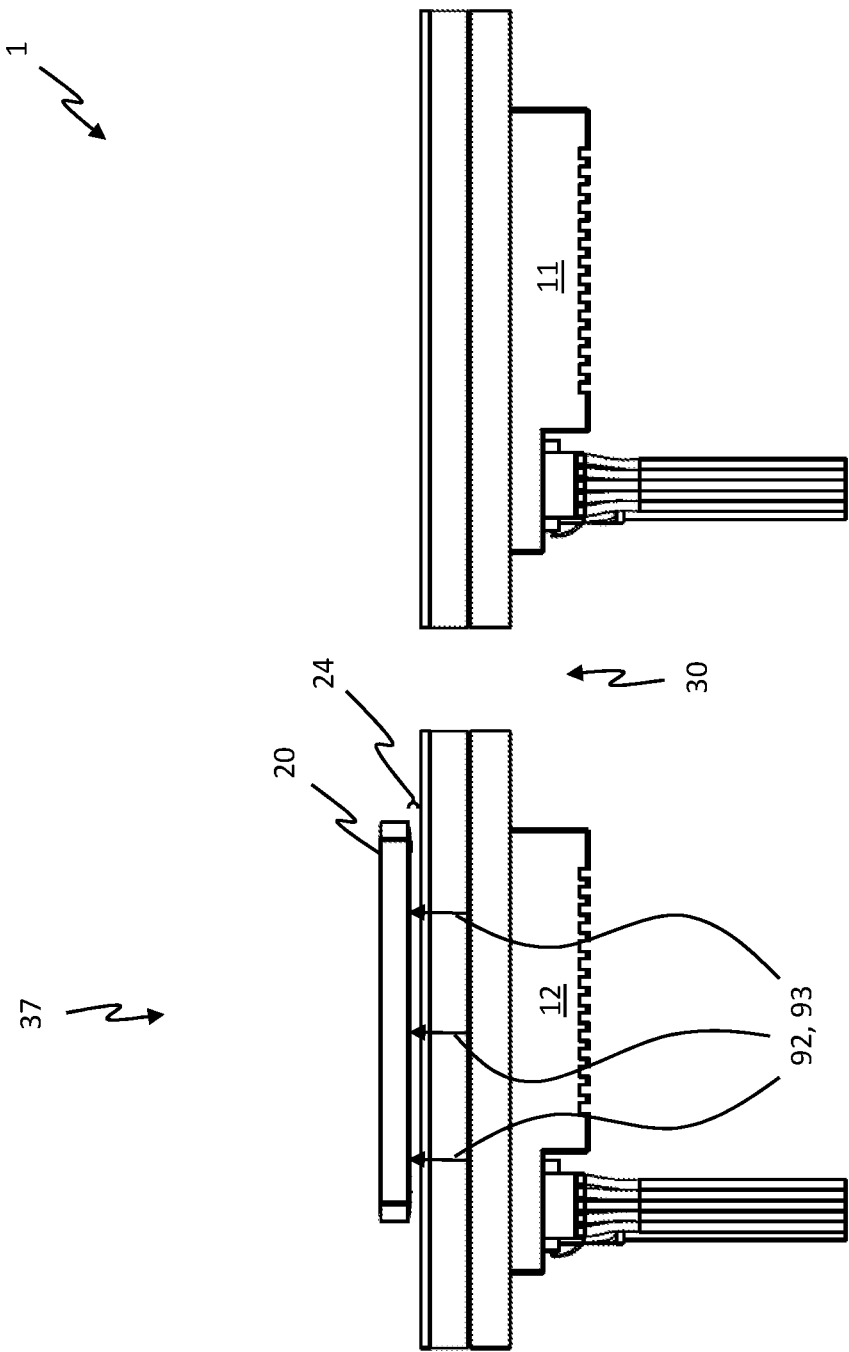
FIG. 7 shows a section of a side view of the planar drive system with a rotor in an end position.

FIG. 7 shows the planar drive system 1 of FIGS. 3 to 6 in which the rotor 20 has moved on to an end position 37. In the end position 37, the rotor 20 is arranged completely above the second stator module 12 and is held in the vertical position 24 by the second magnetic field 92 with the first magnetic field strength 93 and has thus moved across the gap 30 in the course of FIGS. 3 to 7. Here, the second magnetic field 92 is again almost homogeneous since the rotor 20 is arranged completely above the second stator module 12.

The control unit 40 shown in FIG. 1 is set up to carry out the method described. It may be provided that control signals are output to the stator modules 10 by the communication lines 41, wherein a current is applied to the first stator segments 51 and second stator segments 52 shown in FIG. 2 in such a way that the first magnetic field strengths 93 and second magnetic field strengths 94 shown in FIGS. 3 to 7 are set. For this purpose, the control unit 40 may have a corresponding computer program.

In one embodiment of the method, the position detectors 60 shown in FIG. 2 are used to determine a position of the rotor 20 and this position is also taken into account when setting the first magnetic field strengths 93 and second magnetic field strengths 94. For this purpose, the control unit 40 may have communication means 43, by which signals from the position detectors may be read out.

In a further embodiment, the first stator segments 51 or, respectively, the second stator segments 52 comprise conductor strips 54 as described in German patent application DE 10 2017 131 304.4 of 27 Dec. 2017, wherein the first magnetic field strengths 93 and the second magnetic field strengths 94 may be set by a control of the energization of these conductor strips 54, and wherein the control unit 40 is set up to output corresponding control commands.

Figure 8:
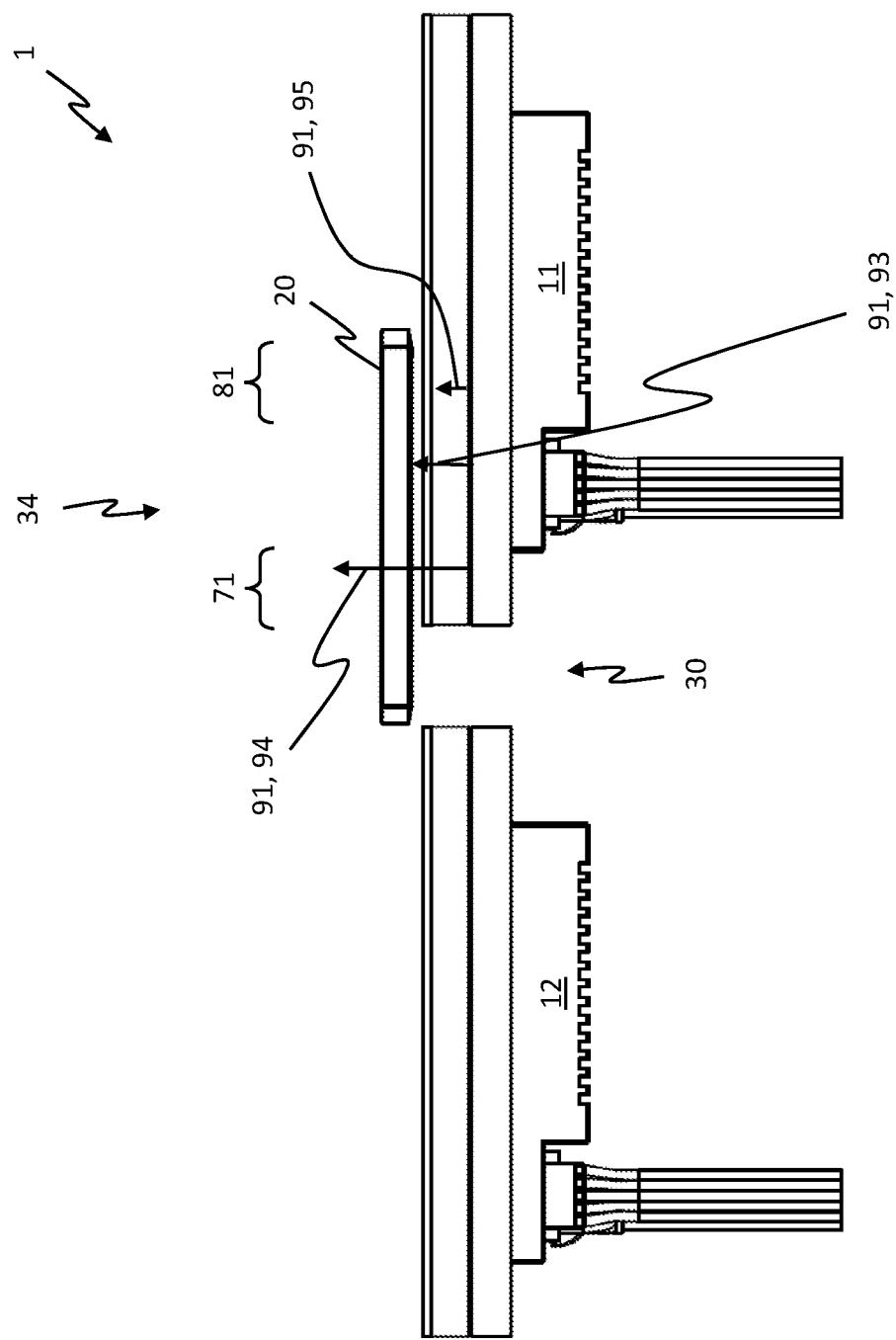
FIG. 8 shows a section of a further side view of the planar drive system with a rotor in the first intermediate position.

FIG. 8 shows the planar drive system 1 of FIG. 4 with the rotor 20 in the first intermediate position 34, wherein the first stator module 11 additionally has a first far range 81 at a distance from the gap 30. In the first far range 81, the first magnetic field 91 has a third magnetic field strength 95 that is smaller than the first magnetic field strength 93. This may further compensate for the lack of magnetic force on the rotor 20 in the area of the gap 30, since the rotor 20 experiences a smaller lifting force in the first far range 81 than in the embodiment example of FIG. 4.

Figure 9:
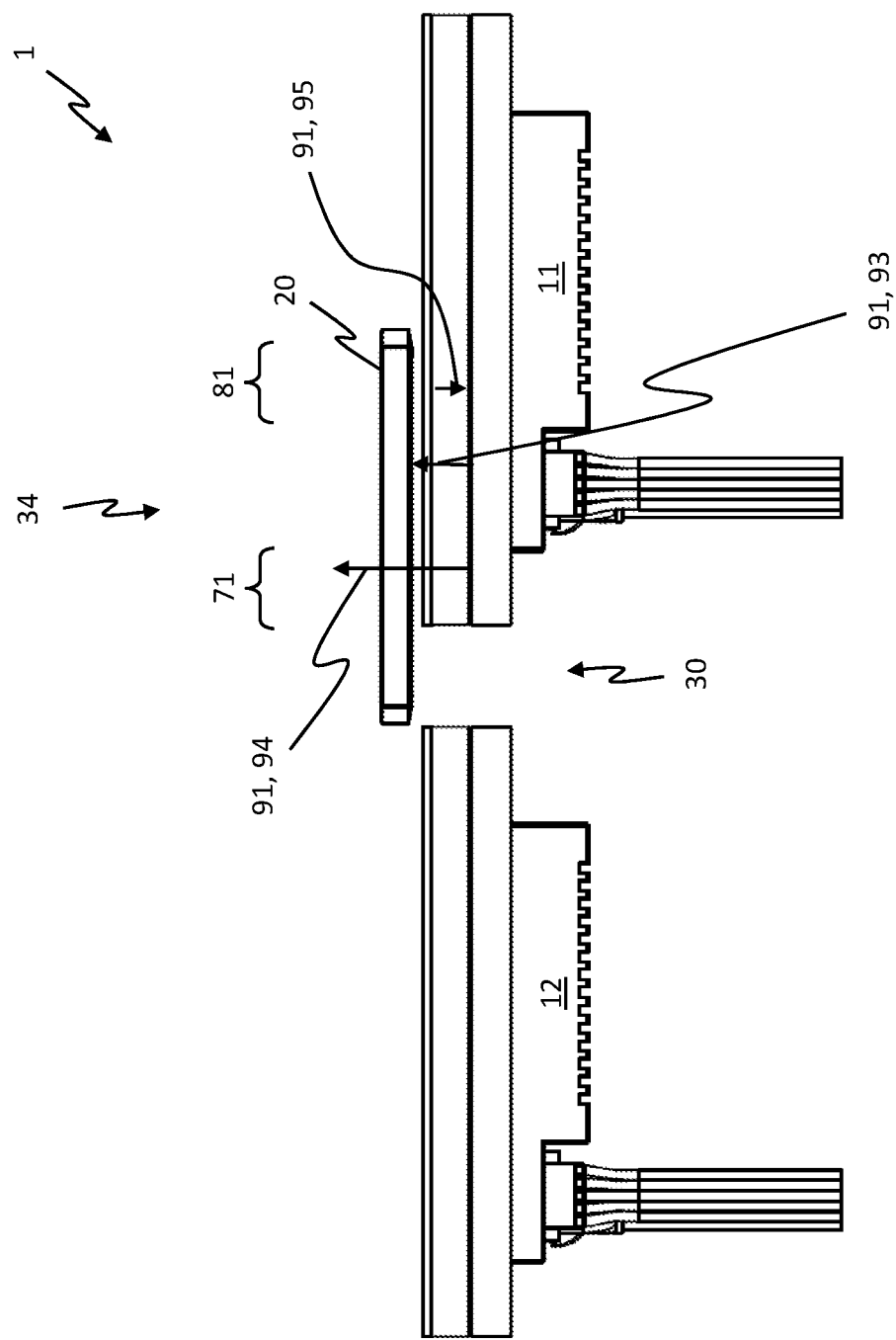
FIG. 9 shows a section of another side view of the planar drive system with a rotor in the first intermediate position.

FIG. 9 shows the planar drive system 1 of FIG. 8, wherein the third magnetic field strength 95 is embodied in such a way that the rotor 20 experiences an attractive force in the first far range 81 due to the third magnetic field strength 95, i.e. a force in the direction of the first stator module 11. Thus, the missing magnetic force on the rotor 20 in the area of the gap 30 may be compensated for even further compared to FIG. 8 and the tilt which acts on the rotor when its center of gravity or its shared center of gravity with a transported product is located above the gap may be compensated for and the rotor may be held in a position parallel to the surface of the first stator module 11.

The first magnetic field strengths 93, second magnetic field strengths 94 and third magnetic field strengths 95 of the first magnetic field 91 shown in FIGS. 8 and 9 may be provided analogously for the second magnetic field 92 of FIG. 6 when the rotor 20 is in the third intermediate position 36.

Figure 10:
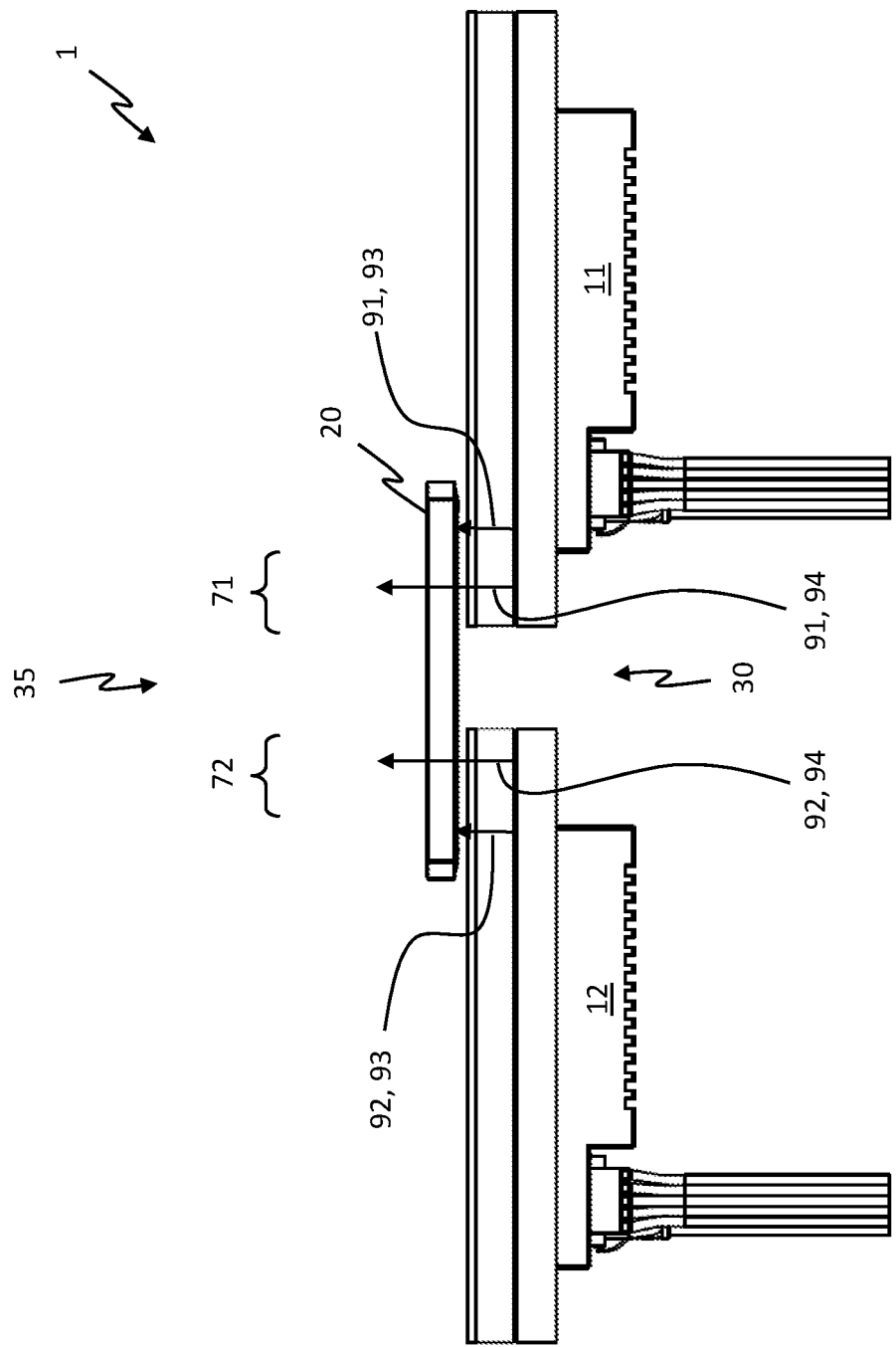
FIG. 10 shows a section of a further side view of the planar drive system with a rotor in the second intermediate position.

FIG. 10 shows the planar drive system 1 of FIG. 5 with the rotor 20 in the second intermediate position 35 in which the first magnetic field 91 in the first intermediate region 71 has the second magnetic field strength 94 and the second magnetic field 92 in the second intermediate region 72 also has the second magnetic field strength 94. In this case, as well, the rotor 20 is held horizontally in the second intermediate position 35, but the increased load-bearing force due to the second magnetic field strength 94 may compensate for the fact that the rotor 20 experiences no load-bearing force in the region of the gap 30. In the case of an uneven loading of the rotor 20 or in the case of an asymmetrical positioning of the rotor 20 above the gap 30 in the second intermediate position 35, the respective first magnetic field strength 93 or the second magnetic field strength 94 of the first magnetic field 91 may also deviate from the respective first magnetic field strength 93 or second magnetic field strength 94 of the second magnetic field 92.

The control of the first magnetic field 91 or the second magnetic field 92 of FIGS. 8 to 10 may also be carried out by the control unit 40 of FIG. 1.

This invention is described with respect to certain representative examples and embodiments, which do not limit the scope of the claims, except as expressly recited therein. Changes and modifications can be made to adapt these teachings to other problems and applications, including the substitution of equivalent features, while remaining within the scope of the invention as claimed.

TABLE 1

List of References: 1-95

1 planar-drive system
10 stator module
11 first stator module
12 second stator module
13 stator surface
14 first movement surface
15 second movement surface
16 first stator layer
17 second stator layer
20 rotor
21 first magnet unit
22 second magnet unit
23 magnetizing period
24 vertical position
30 gap
31 gap width
33 initial position
34 first intermediate position
35 second intermediate position
36 third intermediate position
37 end position
40 control unit
41 communication line
42 computing unit
43 communication means
51 first stator segments
52 second stator segments
53 segment width
54 first energizable conductor strips
55 second energizable conductor strips
60 position detectors
71 first close range
72 second close range
81 first far range
82 second far range
91 first magnetic field
92 second magnetic field
93 first magnetic field strength
94 second magnetic field strength
95 third magnetic field strength

What is claimed is:

1. A method for moving a rotor in a planar drive system, wherein the planar drive system comprises a first stator module, a second stator module, and a rotor, wherein the first stator module and the second stator module are arranged at a distance from each other, and wherein a gap is formed between the first stator module and the second stator module;
   wherein a first magnetic field generated is by the first stator module and a second magnetic field is generated by the second stator module,
   wherein the first magnetic field and the second magnetic field, respectively, hold the rotor in a vertical position at a distance from a surface of the first stator module and/or the second stator module,
   wherein the first magnetic field and/or the second magnetic field comprise a first magnetic field strength to maintain the rotor in the vertical position,
   wherein the first magnetic field and/or the second magnetic field are further used to change a horizontal position of the rotor,
   wherein the first stator module has a first close range adjacent to the gap, and
   wherein in the first close range, the first magnetic field has a second magnetic field strength, the second magnetic field strength being greater than the first magnetic field strength when the rotor is moved across the gap.

2. The method of claim 1,
   wherein the first magnetic field has a third magnetic field strength in a first far range,
   wherein the first far range is arranged at a distance from the gap, and
   wherein the third magnetic field strength is less than the first magnetic field strength when the rotor is moved across the gap.

3. The method of claim 1, wherein the first magnetic field in the first far range exerts a force on the rotor that acts in the opposite direction to the force in the close range.

4. The method of claim 1,
   wherein the rotor is disposed completely above the first stator module in an initial position and is disposed partially above the first stator module and partially above the gap in a first intermediate position,
   wherein the first magnetic field while the rotor is in the initial position is nearly homogeneous over an extension of the rotor and comprises the first magnetic field strength, and
   wherein the first magnetic field while the rotor is in the first intermediate position comprises the second magnetic field strength in the first close range.

5. The method of claim 3,
   wherein the rotor is arranged in a second intermediate position partially above the first stator module, partially above the gap, and partially above the second stator module, and
   wherein the first magnetic field and the second magnetic field hold the rotor parallel to the surface of the first stator module and/or the second stator module while the rotor is in the second intermediate position.

6. The method of claim 5, wherein the second magnetic field, in a second close range of the second stator module adjacent the gap, also comprises the second magnetic field strength.

7. The method of claim 5, wherein the second magnetic field of the second stator module, in a second close range adjacent to the gap, and the first magnetic field of the first stator module, in the first close range adjacent to the gap, have the first magnetic field strength.

8. The method of claim 4,
   wherein the rotor is disposed in a third intermediate position partially above the second stator module and partially above the gap, and
   wherein the second magnetic field in the second close range comprises the second magnetic field strength when the rotor is in the third intermediate position.

9. The method of claim 4,
wherein the rotor is disposed completely above the second stator module in an end position, and
wherein the second magnetic field is substantially homogeneous over an extension of the rotor while the rotor is in the end position.

10. The method of claim 1, wherein the first magnetic field of the first stator module and/or the second magnetic field of the second stator module, during the transition of the rotor from the initial position to the first intermediate position or during the transition from the first intermediate position to the second intermediate position or during the transition from the second intermediate position to the third intermediate position or during the transition from the third intermediate position to the end position, in the first close range and/or in the second close range and/or in the first far range and/or in the second far range, dynamically change between the first magnetic field strength and the second magnetic field strength or the third magnetic field strength, or between further magnetic field strengths different therefrom.

11. The method of claim 1, wherein a position determination of the rotor is carried out by position detectors installed in the first stator module and/or in the second stator module, and a control of the first stator module for setting the first magnetic field and/or a control of the second stator module for setting the second magnetic field is carried out on the basis of the position determination of the rotor.

12. The method of claim 1,
wherein the first stator module includes first energizable conductor strips,
wherein the second stator module includes second energizable conductor strips,
wherein energizing the first energizable conductor strips results in generation of the first magnetic field, and
wherein energizing the second energizable conductor strips results in generation of the second magnetic field.

13. A computer readable, non-transitory data storage medium having program code stored thereon, which, when executed on a computer processor, causes the computer processor to perform the method of claim 1.

14. A control unit comprising:
a computing unit, and
communication means, the communication means being configured to read signals from position detectors of stator modules and to output control signals for the stator modules,
the control unit being configured to output a control signal for controlling magnetic fields of the stator modules to the stator modules on the basis of the signals of the position detectors and a travel path predetermined for a rotor across a gap arranged between two stator modules in such a way that the magnetic fields generated by the stator modules are varied at least temporarily during a crossing of the gap,
wherein the control unit is configured to output the control in a way that a first magnetic field and/or a second magnetic field comprise a first magnetic field strength to maintain the rotor in a vertical position, that the first magnetic field and/or the second magnetic field are further adaptable to change a horizontal position of the rotor, that a first stator module has a first close range adjacent to the gap, that in the first close range the first magnetic field has a second magnetic field strength, the second magnetic field strength being greater than the first magnetic field strength when the rotor is moved across the gap.

15. A planar drive system comprising the control unit according to claim 14, and further comprising:
at least two of said stator modules arranged at a distance to each other, with the gap arranged therebetween, and the rotor.

16. A planar drive system comprising:
at least two stator modules arranged at a distance to each other, with a gap arranged therebetween,
a rotor, and
a control unit comprising a computing unit and communication means, the communication means being configured to read signals from position detectors of the at least two stator modules and to output control signals for the at least two stator modules,
the control unit being further configured to output a control signal for controlling magnetic fields of the at least two stator modules to the at least two stator modules, on the basis of the signals of the respective position detectors and a travel path predetermined for the rotor across the gap arranged between the at least two stator modules, in such a way that the magnetic fields generated by the at least two stator modules are varied at least temporarily during a crossing of the gap by the rotor.

* * * * *